United States Patent [19]
Wagner et al.

[11] 3,762,902
[45] Oct. 2, 1973

[54] SHAPING, COATING AND TEMPERING GLASS

[75] Inventors: William E. Wagner, Verona; James S. Golightly, Pittsburgh, both of Pa.

[73] Assignee: PPG Industries, Inc., Pittsburgh, Pa.

[22] Filed: Apr. 24, 1972

[21] Appl. No.: 246,902

Related U.S. Application Data

[63] Continuation-in-part of Ser. No. 123,391, March 11, 1971, abandoned, which is a continuation of Ser. No. 852,788, Aug. 25, 1969, abandoned.

[52] U.S. Cl............................. 65/60, 65/62, 65/104
[51] Int. Cl....................... C03b 23/02, C03c 17/04
[58] Field of Search........................... 65/60, 62, 104

[56] References Cited
UNITED STATES PATENTS

| | | | |
|---|---|---|---|
| 2,566,346 | 9/1951 | Lytle et al............................ | 65/60 X |
| 3,021,227 | 2/1962 | Richardson......................... | 65/60 X |
| 3,078,693 | 2/1963 | Lytle...................................... | 65/60 |
| 3,223,501 | 12/1965 | Fredley et al....................... | 65/60 X |

FOREIGN PATENTS OR APPLICATIONS

940,210 10/1963 Great Britain.......................... 65/60

Primary Examiner—Arthur D. Kellogg
Attorney—Russell A. Eberly

[57] ABSTRACT

Shaping, coating and tempering glass sheets in a continuous process comprising supporting a glass sheet in bending relation to a mold, heating the sheet in an enclosed atmosphere until it conforms to the mold, coating at least a surface of the bent sheet while so supported by applying a coating composition for a time sufficient to produce a coating thereon and while exposing its other surface to a cool atmosphere, discontinuing the coating before the glass temperature falls below the strain point, and then quenching both surfaces of the sheet rapidly with relatively cold tempering medium to impart at least a partial temper to the bent coated glass sheet before removing the sheet from the supporting mold. The temperature treatment can also simultaneously fuse a metalo-ceramic frit applied to a portion of the coated surface before said heating starts.

26 Claims, 3 Drawing Figures

GLASS PROCESSING STEPS

```
┌─────────────────────────────────────────────────────────────┐
│ APPLY FUSIBLE ELECTROCONDUCTIVE FRIT TO GLASS SURFACE       │
└─────────────────────────────────────────────────────────────┘
                              │
┌─────────────────────────────────────────────────────────────┐
│ MOUNT GLASS SHEET ON OUTLINE MOLD WITH FRIT FACING          │
│ UPWARD                                                      │
└─────────────────────────────────────────────────────────────┘
                              │
┌─────────────────────────────────────────────────────────────┐
│ HEAT GLASS SHEET TO DEFORMATION TEMPERATURE TO              │
│   SHAPE GLASS SHEET AND FUSE FRIT TO GLASS                  │
└─────────────────────────────────────────────────────────────┘
                              │
┌─────────────────────────────────────────────────────────────┐
│ APPLY FILM FORMING COMPOSITION TO UPPER GLASS               │
│ SURFACE OF BENT GLASS SHEET WHILE STILL HOT AND             │
│ WHILE EXPOSING BOTTOM GLASS SURFACE TO COOL                 │
│ ATMOSPHERE                                                  │
└─────────────────────────────────────────────────────────────┘
                              │
┌─────────────────────────────────────────────────────────────┐
│ SUDDENLY QUENCHING BOTH GLASS SURFACES WITH                 │
│  QUENCHING MEDIUM BEFORE GLASS COOLS TO STRAIN POINT        │
└─────────────────────────────────────────────────────────────┘
```

SHAPING, COATING AND TEMPERING GLASS

RELATION TO OTHER APPLICATIONS

This application is a continuation-in-part of application Ser. No. 123,391, filed Mar. 11, 1971, which, in turn, is a continuation of application Ser. No. 852,788, filed Aug. 25, 1969, both now abandoned.

GENERAL DESCRIPTION

This invention relates broadly to a method of shaping, coating and strengthening glass sheets and is more particularly directed to a single, continuous method that uses a single heating operation to soften a glass sheet for heat-shaping, for applying a film-forming composition onto the bent sheet of glass to provide thereon a transparent coating having some desirable properties and to chill the bent, coated glass sheet with sufficient rapidity to impose at least a partial temper thereto. The invention also incorporates using the heat required for bending the glass to secure bus bars to a surface of the glass sheet. In use, the bus bars are connected electrically to a source of power so as to enable the source of power to heat the coated glass sheet to remove fog or ice that forms when the window is exposed to high humidity conditions.

The present invention is suitable for use in fabricating windows for vehicles such as aircraft, trains, autos, boats and the like. In addition, the present invention is also susceptible of use in forming bay windows and the like, for building structures such as homes, greenhouses for gardens and other non-vehicular purposes such as cover plates for instrument panels and other devices such as television tubes and the like. Other suitable products are glass sheets having grounded electroconductive circuits thereon to defeat radar detection, to dissipate a charge before it builds up sufficiently to cause static, and the like.

In order to fabricate such products, it is necessary to impart a shape and apply a coating to a glass sheet. In addition, for certain purposes such as in aircraft panels, it is also necessary to apply a temper to strengthen the glass to enable the coated window to withstand thermal and mechanical stresses encountered during flight. Until recently, the shaping and coating steps were performed separately.

In U.S. Pat. No. 3,021,227 to Ronald E. Richardson, assigned to PPG Industries, Inc., a conveyor extending through a bending furnace and a coating station is provided. The conveyor moves a glass laden mold through the bending furnace where a heating operation is conducted until the glass sags by gravity into conformity with the shaping surface of a mold and then moves the heated glass sheet into the coating station where a coating having heat-screening properties is applied over a portion of its surface before the glass cools below the film forming temperature. In this patent, the bent, partially coated glass sheet is removed from the mold after the coating operation and allowed to cool in air. If the glass is to be tempered, it must be reheated and chilled suddenly for a thermal tempering operation. Similar reheating is needed for a chemical tempering treatment which may affect the coating previously applied to a portion of the curved surface.

Another patent typical of the prior art is U.S. Pat. No. 3,078,693 to Lytle, which covers a technique for applying a band of coating with a curved cut-off line onto a flat glass sheet. The flat, partially coated glass sheet is then reheated for bending and tempering in a separate operation.

The prior art depicted by the aforesaid Richardson and Lytle patents require separate processing steps for providing a finished product. Such separate processing introduces the possibility of added losses due to handling. In addition, reheating during the separate operations may introduce crazing in the coating previously formed.

In U.S. Pat. No. 3,305,336 to Browne and Beckham, glass sheets are conveyed while supported on bending molds through a heating furnace where the glass is heated to deformation temperatures sufficient to sag into conformity with the shape of the mold, followed by chilling the glass to impose a temper and spraying a portion of the tempered glass sheet surface while sufficient residual heat remains in the glass to convert the coating composition into a metal oxide coating on the portion of the sheet surface that it contacts. While the process depicted by the Browne and Beckham patent provides a continuous operation and avoids the necessity of removing the glass sheet from the bending mold before the processing is completed, the application of a coating composition to a glass sheet after it has been bent and chilled sufficiently to impose a temper therein results in a coating that has poor durability. Furthermore, no known metal oxide film, formed by pyrolyzing an organic or inorganic metal compound to form a metal oxide coating, has adequate electroconductive properties for removing fog or mist by application of voltages presently available in vehicles when the film forming composition is applied to a glass sheet at a temperature the glass attains immediately after a previous quenching with air blasts.

The present invention provides an improved technique for fabricating shaped, coated, tempered glass sheets having a permanent coating of any desirable property applied over any desired part or all the surface of the glass sheets. Succintly, the present invention involves the concept of changing the order of steps in a continuous line operation so that the film-forming composition is applied to the heated bent glass sheet while supported on a shaping mold while the glass is sufficiently hot to cause the resultant coating to have better optical properties, durability and other desired properties than the coating produced by the prior art continuous technique. In essence, the present invention provides a method for performing the following steps in which the glass is first supported while flat on a conventional mold having an upwardly facing shaping surface of a curved elevation conforming to the shape desired for the glass sheet after it is shaped, the glass is heated to sag to conform to the mold shaping surface, a film forming composition is applied to the heated, bent, supported glass sheet immediately after the hot sheet conforms to the shaping surface and the coated, shaped glass sheet is rapidly chilled after a short interval during which heat from the glass interior reheats the surface by quenching both of its surfaces while the sheet is still supported on the same bending mold to impart at least a partial temper to the bent, coated sheet.

In cases where one or more bus bars are required for the finished article, a strip of metal-ceramic frit is applied for each bus bar required before the thermal treatment starts. The heating and cooling steps fuse the frit onto the glass surface at the same time as the glass is bent, coated and heat-strengthened in the proper order. But, if the frit coated glass is quenched before spraying, the resulting film makes poor electrical contact with the bus bars.

The conductivity of the films formed may be measured by ohmmeters. Suitable means are also known and available to the art for making an accurate determination of the tension and compression characteristics, i.e., the magnitude and type of stress or strain, within a particular body of glass.

The particular means used for optically measuring stresses, both tensile and compressive, involves placing the sheets of bent and tempered glass between a polarized light source and graduated quartz wedge. The quartz wedge is calibrated in millimicrons. The polarized light passes through the thickness dimension of the sheets to be measured and the quartz wedge. A trained observer viewing directly into the quartz wedge will see a distinctive band which delineates and defines the maximum deviation of polarized light caused by the particular type of stress being observed. The graduations on the quartz wedge permit a direct reading of the magnitude of the strain in millimicrons per glass thickness or the maximum deviation of a beam of polarized light from the path it would take through the thickness of the glass if the glass were unstressed.

The locality within the glass sheets which is to be measured is either selected or it is possible to locate the point of maximum stress by scanning the surface area of the glass sheets. The strain corresponding to the stress, at the selected locality, is then measured by looking through the quartz wedge directly into that locality. In tempered glass, the compression stress is a maximum at the surface. The compressive stress of the peripheral margin of tempered glass sheets is measured by looking at the surface of the sheets directly at their edge, i.e., the compressive stress zone.

The graduations on the quartz wedge give the measured strain value in units of millimicrons per glass thickness. The measured strain value, adjusted to millimicrons per inch, may be converted to pounds per square inch stress units by multiplying by the stress optical coefficient. The stress optical coefficient will vary for different glass compositions. For float or plate glass, such as used in automobile windshields, the stress optical coefficient is 2.13 pounds per square inch for each millimicron per inch of strain.

The present invention will be understood more readily in the light of a description of an illustrative embodiment which follows.

DESCRIPTION OF THE DRAWINGS

In the drawings which form part of the description of the illustrative embodiment which follows and wherein the reference numbers refer to like structural elements.

DESCRIPTION OF ILLUSTRATIVE EMBODIMENT

Referring to the drawings, a horizontally extending conveyor system 11 comprising longitudinally aligned rolls 12 are mounted to extend horizontally between transversely spaced pairs of bearing housings 13. The latter oppose one another in laterally spaced relation.

The conveyor system 11 extends through a heating furnace 14, a spray station 16 and a quenching station 18. The horizontal conveyor also has exterior portions including a loading section 20 outside the heating furnace 14 and an unloading station 22 beyond the quenching station 18. The horizontal extending conveyor system 11 provides a path of movement for glass laden molds to support glass sheets for movement through the heating furnace 14, the spray station 16 and the quenching station 18 in timed sequence as may be controlled either by an operator viewing the operation or automatic controls as determined by thermal sensing units such as devices as sold under the trade name of Rayotubes, which are well known in the art.

The entire length of the conveyor is supported on horizontal I-beams 24 which in turn are supported from vertical posts 26 spaced along the length of the I-beams to support the latter. The I-beams 24 are disposed on opposite sides of the conveyor system 11, to support the bearing housings 13.

The conveyor system comprises a first section controlled by a first motor 30 that runs intermittently to transfer a mold from the heating furnace 14 to the spray station 16 and another mold from the loading station 20 to the heating furnace 14 in a manner well known in the art. A second motor 32 controls the intermittent movement of glass laden molds from the spray station 16 to the quenching station 18 and from the latter to the unloading station 22 via an additional cooling station, if desired. Slip clutches (not shown) are provided to selectively couple the conveyor rolls in the spray station 16 to motor 30 or motor 32 as required in a manner well known in the art.

The heating furnace 14 is of the tunnel-type and comprises an entrance door 36 and an exit door 37. Each of the doors 36 and 37 are suitably counterweighted by weights suspended from a pulley contained in a motor-driven pulley housing 38 disposed over the entrance and exit of the furnace, respectively. The roof and the floor of the furnace are provided with heating elements 40 arranged in nine rows side by side, each extending substantially the full length of the furnace. The heating elements are preferably of the electrical resistance type and each row of elements has a separate control (not shown) for controlling a pair of vertically opposed rows of heating elements so as to provide a heating pattern transverse to the path defined by the horizontal conveyor system 11. The floor, side walls and roof of the heating furnace 14 are of refractory material as is common in the art.

Figure 1:
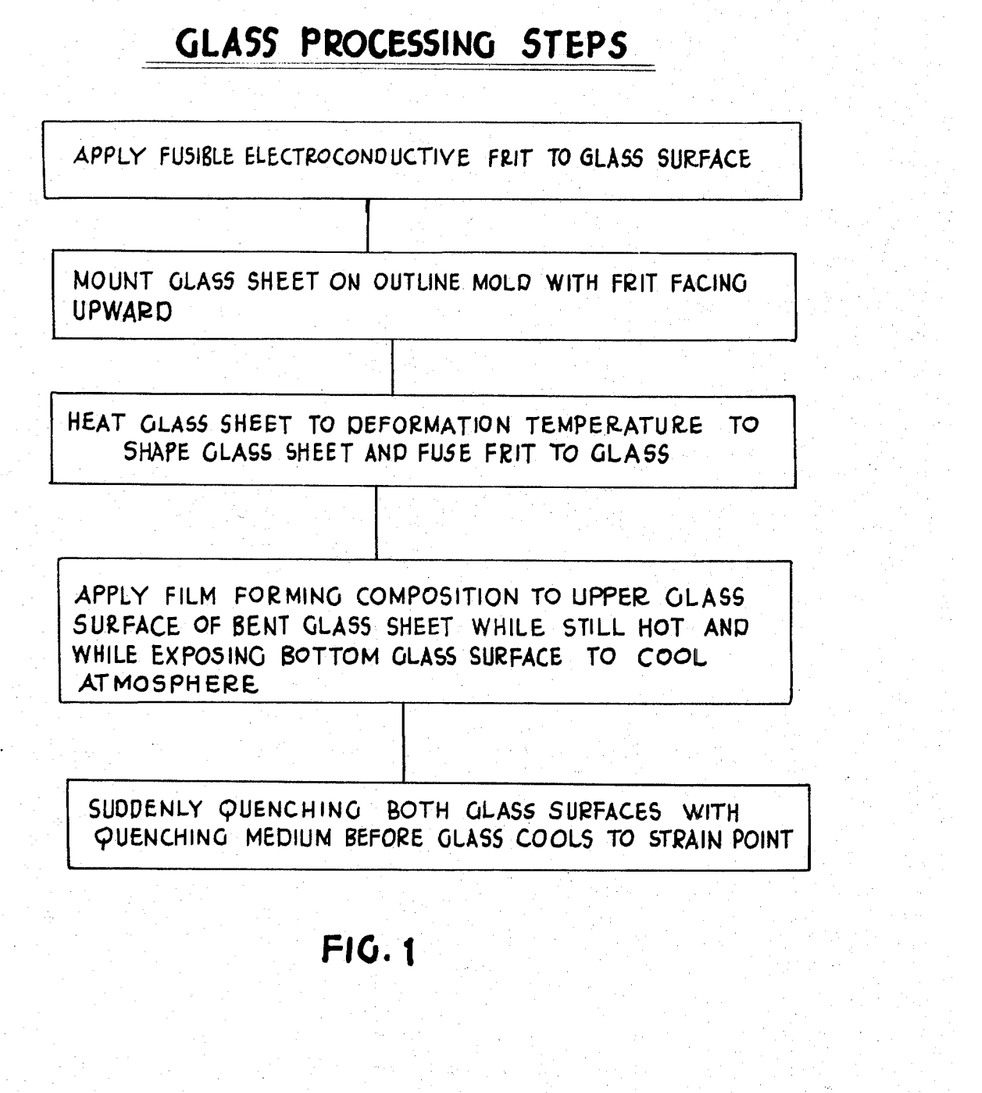
FIG. 1 is a chart of glass processing steps illustrating a typical method for performing the present invention.
Figure 2:
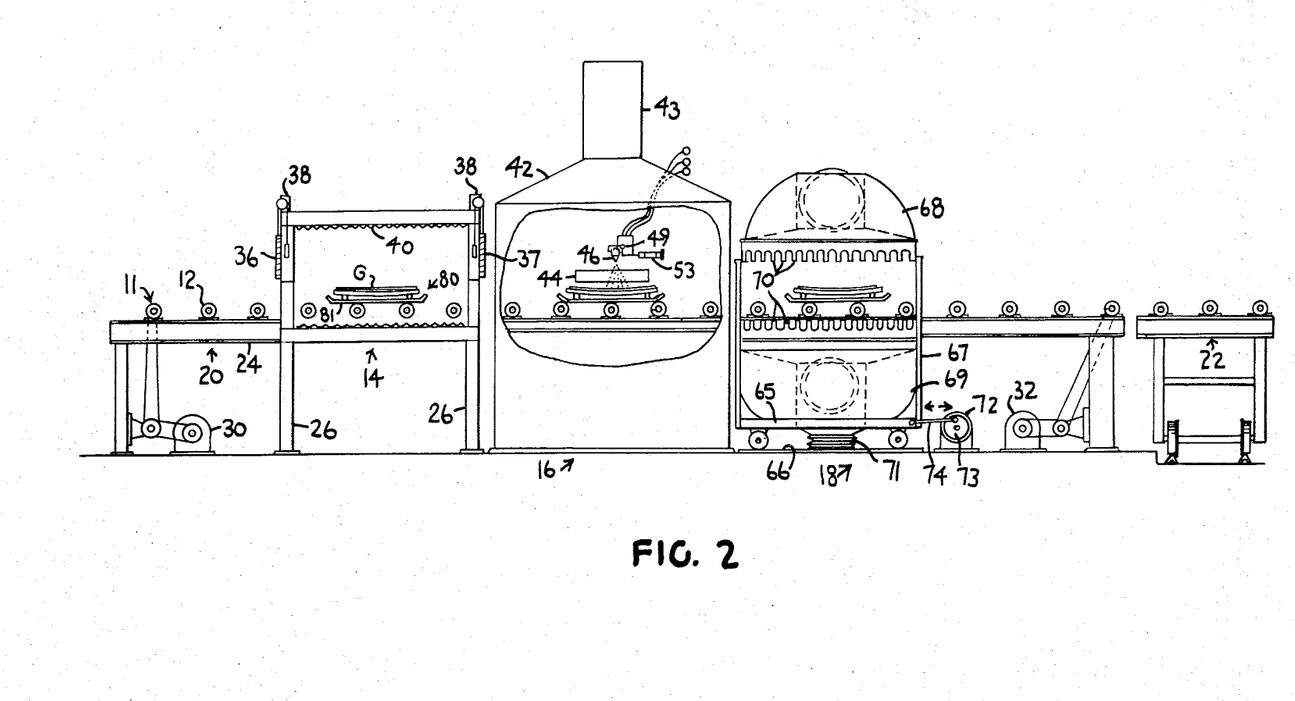
FIG. 2 is a longitudinal elevational view of apparatus for performing the method illustrated in FIG. 1 with certain parts shown in section.

The spray station 16, otherwise referred to as a spray booth, comprises a chamber enclosed by a hood 42 (FIG. 2) leading to a vacuum exhaust system 43. A pair of windows 44 are provided in the opposite walls of the spray station chamber for the benefit of operators tending the equipment.

Figure 3:
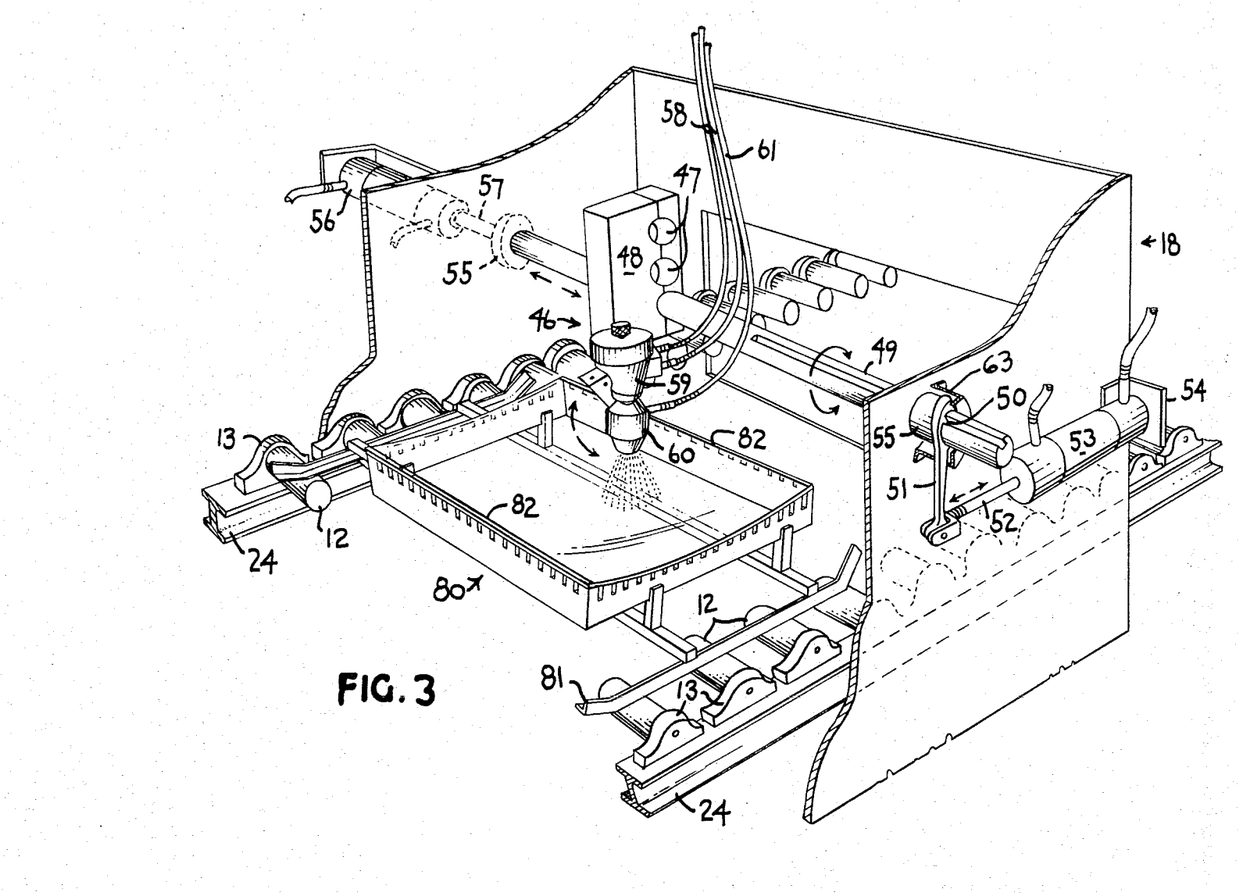
FIG. 3 is an enlarged, perspective view illustrating a reciprocatable and pivotable spray gun used in the spray station of the apparatus of FIG. 2.

Within the spray station 16, a spray gun 46 is shown in FIG. 3 mounted on a sectionalized bracket 48 whose sections form an abutting border that intersects several parallel apertures 47. The bracket is secured to a swivel bar 49 in one of several positions to adjust the vertical position of the spray gun 46 relative to the glass by aligning one of the apertures 47 with the swivel bar 49 and securing the bracket 48 to the swivel bar in the selected vertical position. The swivel bar 49 extends across the entire width of the spray station 16 and is slotted lengthwise near one end portion to receive a key 50 at the upper end of a link 51 which extends through a slot in a slotted housing 63 that is partly broken away.

The other end of the link 51 is pivoted to the end of a piston rod 52. The piston rod is controlled by a solenoid valve (not shown) which controls the flow of air into the opposite sides of its piston at the other end of the piston rod 52 within an air cylinder 53 supported on a bracket 54. Sleeves 55 are attached to the side walls of the spray chamber to provide bearing support for the swivel rod 49 and the link 51. A cross piston 56 having a rod 57 in thrust bearing relation to the unslotted end of the swivel bar 49 is provided to reciprocate the swivel bar 49 axially so that the spray gun 46 moves in a path across the length of the conveyor system 11. In addition, the piston rod 52 controls the orientation of the spray gun. Moving the piston within cylinder 53 rotates the link 51 and its attached key 50, and thus rotates the swivel rod 49 and swivels the spray gun 46 attached thereto about an axis defined by the length of swivel rod 49. Thus, spray gun 46 is able to reciprocate linearly axially of swivel rod 49 and oscillate in an arcuate manner about the axis provided by swivel rod 49 as needed to insure that the spray composition applied through spray gun 46 covers the entire upper surface of a glass sheet at the spray station 16.

The spray gun 46 is preferably of the Binks type spray gun generally available commercially. The gun has a pair of supply hoses 58 bringing ingredients to a mixing chamber 59 and a head 60 where air from an air hose 61 is mixed with the mixture from the mixing chamber 59 to propel the coating composition to the upper surface of a glass sheet at the requisite volume per unit time. In case glass sheets to be sprayed at the spray booth are non-rectangular in configuration, an adjustable nozzle of the type described in U.S. Pat. No. 2,715,046 to Robert L. Ackerman, assigned to PPG Industries, Inc., may be employed. The spray head is preferably adjusted to provide a flat band spray that covers the entire width of a glass sheet located thereunder.

Glass sheets are substantially uniformly coated with transparent electroconductive coatings of tin oxide when sprayed with a pyrolizable film forming composition that deposits 30 to 50 cubic centimeters per square foot of glass sheet surface, depending on the conductivity desired for the resulting film to provide a resisitivity as little as less than 10 ohms per square at a film thickness of 200 millimicrons.

The quenching station 18 includes a carriage 65 reciprocated on tracks 66. The carriage supports an open frame 67 supporting two plenum chambers disposed on opposite sides of the conveyor system 11, including an upper plenum 68 and a lower plenum 69. The plenums have nozzle openings 70 disposed on opposite sides of the path taken by glass sheets, preferably at about equal distances therefrom. Each plenum chamber is connected to a blower or compressor (not shown) in the usual manner conventional in the art through flexible portions 71 to permit the nozzles to move to and fro relative to a glass sheet while tempering fluid is supplied under pressure against the upper and lower surfaces of the glass sheet occupying a position at the quenching station. The nozzles 70 extend transversely of the path defined by the conveyor system 11 in spaced relation therealong. Damper means (not shown) may be provided in the tempering fluid supply system to regulate the relative pressures of air blasts provided against the upper and lower glass sheet surfaces. The frame 67 and the air supplying system comprising the conduits and the apertured pipes are arranged to provide clearance for the portion of the conveyor system 11 that extends through the quenching station 18. In addition, a motor 72 actuates eccentrics 73 which are attached to the frame 67 through driving links 72 to reciprocate the nozzles 70 in a direction transverse to their length, so that the air blasts delivered through the air pipes sweep across the upper and lower surfaces of the sheet in a to-and-fro motion.

An outline mold 80 is supported on a carriage provided with spaced elongated runners 81 that rest on the stub rolls 12 of the conveyor system 11 and are propelled forward whenever the stub rolls 12 rotate. In FIG. 3, a glass sheet G is shown in perspective at the spray station 16 with bus bars 82 applied along the leading and trailing transverse edge portions of its upper surface. A different configuration may make it more suitable to apply strips which mature into bus bars along the opposite edges extending generally along the path of movement.

BUS BAR COMPOSITIONS

A suitable heating panel made according to the present invention comprises a glass sheet, usually of window or plate or float glass, provided with conducting metal strips suitable for bus bars on the margins adjacent to the edges thereof and a conducting transparent coating. As described in U.S. Pat. No. 2,648,754 to William O. Lytle, assigned to PPG Industries, Inc., these metal strips should adhere firmly to the glass sheet and should have total conductivity, not less than 10 to 20 times that of the conductive coating. In the preferred embodiment, these metallized strips are produced by applying a metalized coating strip, usually 0.1 to 1 inch wide, upon the surface of the sheet to be treated and close to a pair of opposite edges thereof. This metallized coating must be capable of withstanding the temperatures and oxidizing conditions of treatment, and therefore should be of a ceramic or vitreous character and further should be capable of glazing or otherwise forming an aherent, well-bonded coating to the glass. In general these compositions comprise a highly conductive metal powder and a vitrifying binder. Typical ceramic conductive coating materials which may be used may have the following composition:

Composition No. 1

| | Per cent by weight |
|---|---|
| PbO | 7.5 |
| $B_2O_3$ | 1.0 |
| $SiO_2$ | 1.5 |
| Flake silver | 70.0 |
| French fat oil | 12.5 |
| Turpentine | 7.5 |

Composition No. 2

| | Per cent by weight |
|---|---|
| Finely divided silver | 72.6 |
| PbO | 9.3 |
| $SiO_2$ | 1.7 |
| $B_2O_3$ | 1.4 |
| Water | 7.5 |
| Ethyl alcohol | 7.5 |

In order to avoid production of bus bars which will develop in use excessive stresses in the glass, the thickness of the frit coating to be applied should not exceed about 0.005 inch and preferably should be below about 0.003 inch.

The composition of the metal bus bars is of such a nature that when the sheet is heated to the temperature required for further processing, the binder is vitrified, the glass is heat-softened to sag into conformity with the outline mold, and application of the conductive coating may be effected, for example, above the strain point of the glass, usually 1.000° to 1,300° Fahrenheit, depending on the chemical composition of the enamel and the glass thickness. During this heating operation, the ceramic metal coating becomes glazed and is baked onto the glass so that a firm bond between the glass and the metal coating is established. At the same time, the glass softens and its marginal portion conforms to the shape of the mold.

COATING COMPOSITIONS

When the glass has been heated to said elevated temperature, it is withdrawn from the heating chamber and immediately is sprayed with a film forming composition before substantial cooling of the glass sheet can take place. Generally, an organic metal composition or an inorganic metal salt dispersed in an acidic composition and an organic solvent is used as the film forming composition, which pyrolizes on contact with hot glass to form a metal oxide film. Typical suitable compositions are described in U.S. Pat. Nos. 2,566,346 to Lytle and Junge, 2,569,773 to Orr, 2,614,944 to Lytle, 2,688,565 and 2,691,323 to Raymond, 2,694,761 to Tarnopol and 2,740,731 to Lytle and Junge. The following formulations are satisfactory for a composition that hydrolyzes on contact with hot glass to form a conductive tin oxide film:

FORMULATION I 2,360 grams of dibutyl tin oxide
1,180 grams of ammonium acetate,
1,749 cubic centimeters of 30% HF in methanol
300 cubic centimeters of triethylamine
50 cubic centimeters of HCl (36%)

FORMULATION II 75 grams of anhydrous stannic chloride
30 grams of water
30 grams of methanol
10 grams of phenylhydrozine hydrochloride
10 grams 50% HF in water A typical inorganic solution which may be used for establishing a conductive tin oxide coating consists of 50 cubic centimeters of solution A enumerated below plus 30 grams of methyl alcohol and 30 grams of an aqueous solution of hydrofluoric acid containing 48 percent by weight HF. Solution A contains 20,430 grams of anhydrous stannic chloride, 918 grams of an aqueous solution containing 10 percent by weight of dioctyl sodium sulfo-succinate, 7,056 cubic centimeters of water and 1,854 cubic centimeters of methanol.

While both inorganic and organic tin compositions produce tin oxide coatings on pyrolysis with hot glass, a preferred composition contains an organic solvent, an organic tin compound and an ionizable fluorine containing compound. A desirable organic tin compound is dibutyl tin oxide, whereas hydrofluoric acid containing 48% HF is a suitable source of ionizable fluorine. Methanol is a suitable solvent although mixtures of an alcohol containing up to four carbon atoms with an aromatic non-polar solvent from the class consisting of benzene, toluene and xylene are excellent solvents. A quantity of this composition is placed in an atomizing spray gun and the heated glass sheet is sprayed with an atomized spray of this material for a brief period usually of the order of 2 to 20 seconds depending upon the thickness of film to be produced, the air pressure imposed upon the atomizing spray gun, the size of the glass coated, etc..

Other suitable techniques for applying a conductive film to cover the glass sheet surface and the bus bars include chemical vapor deposition, cathode sputtering, vacuum deposition and the like. It is preferred to use a technique where a film forming composition forming a highly electro-conductive film by pyrolysis is utilized to enable the use of presently existing equipment with a minimum of alteration.

ILLUSTRATIVE OPERATIONS

A glass sheet containing a pair of stripes of fusible metalo-ceramic frit material such as described above, one extending along each of the opposite end edges, is mounted on a bending mold of outline configuration and concave elevation whose upper surface conforms to the shape desired for a bent glass sheet and the glass laden mold is introduced into the heating furnace 14. The glass sheet is oriented in the conveyor so that the opposite side edges provided with the ceramic silver stripes 82 are the leading and trailing edges of the glass sheet. The ceramic coatings form bus bars of ¼ inch width and the thickness not exceeding about 0.005 inch. The glass is heated to a temperature of approximately 1,300° Fahrenheit. The time and furnace temperature needed to heat the glass sheet to the desired temperature varies from glass to glass and the parameters mentioned are for a soda-lime-silica sheet glass composition normally used commercially. The heating elements 40 in the furnace 14 are adjusted to provide up to 3 kilowatts per square foot of heating area for both the top wall and bottom wall of the furnace. Thus, for a furnace output of 125 kilowatts, a glass sheet of ¼ inch nominal thickness attains its temperature and sags to conform to the outline mold in about 4 to 5 minutes depending upon the depth and complexity of bend required, while a glass sheet of ⅛ inch nominal thickness attains its temperature and sags to conform to the outline mold in about 80 to 100 seconds.

The glass is then moved to the spray booth 16 where it is exposed to 30 to 50 cubic centimeters per square foot of a suitable metal oxide film forming composition that pyrolizes on contact with the hot glass surface to form a film containing tin oxide, indium oxide and the like. The coating so formed is also formed over the bus bars 82.

A film having resistivity of 9 ohms per square for film thickness of 100 to 120 millimicrons was formed using Formulation I recited above. The temperature of the glass at the beginning of the spraying operation was about 1,250 degrees Fahrenheit. A single spray coating lowered the glass surface temperature to about 900° Fahrenheit after 4 seconds of spraying. In another 4 seconds, the surface temperature recovered to 1,150° Fahrenheit. When the spray guns applied the coating in three passes during 4 seconds, the surface temperature lowered to about 1,050° Fahrenheit and recovered to over 1,200° Fahrenheit. The resistance across a 20 inch wide panel was 40 ohms after a single pass reciprocation. Another panel the same size had a bus to bus resistance of only 10 ohms after three reciprocations of the spray gun during the application of the coating of the film forming material.

The coating was discontinued and the coated, bent glass was then moved to the quenching station in about 2 to 4 seconds. During this transfer, the residual interior heat in the glass reheated the surfaces to a temperature sufficient to impart at least a partial temper to the reheated glass. The air pressure at the nozzles of the quenching station was 16 ounces per square inch. The nozzles were spaced 5 inches apart with the glass approximately midway between the upper and lower apertured nozzles. The spray gun swivel bridge in the spray station was placed between 1 to 1 ½ feet above the position occupied by the glass on the outline mold. The spray gun was swiveled on the swivel rod 3 to 4 times above the glass in about 4 seconds during the multiple spray process.

The temper of the glass was such that compressive stress values at the surface above 9,000 pounds per square inch were obtained for bent, coated glass sheets of ¼ inch thickness. For thinner sheets (5/64 inch thick) the compressive stress values were over 4,000 pounds per square inch.

For relatively low production such as in the production of aircraft parts, a batch operation is used. The glass is moved into a one stage furnace 14 and when its temperature reaches the desired level, about 1,300° Fahrenheit, the exit door 37 is opened and the glass transferred to the spray station 16 where spraying commences almost as soon as the glass sheet stops in alignment with the spray gun, so that the movements of the spray gun cause the glass to be completely covered by the spray. The glass, which cools to about 1,200° to 1,250° Fahrenheit surface temperature before spraying begins, cools somewhat more during the spray operation, with the spray cooling the top surface and the air in the spray station cooling the exposed bottom surface of the glass during the coating step.

Applying the film forming composition to the hot glass while the under surface is exposed reduces the temperature gradient through the glass thickness and, hence, minimizes thermal warpage that would occur in the absence of under surface exposure. However, the glass is not chilled unduly because its exposure at the coating station lasts a few seconds only and this is insufficient to cool the glass interior to below the strain point and permits recovery. Thus, the glass reaches the quenching station at a temperature sufficiently above the strain point to develop a suitable temper, particularly when bent, coated glass sheets of ¼ inch thickness are moved into the cooling station 18 in 2 to 4 seconds after only 3 to 4 seconds of exposure to the coating composition.

Generally, the spray gun need not be pivoted nor reciprocated to cover a rectangular sheet of glass with a maximum dimension of 12 inches. The vertical distance from the spray gun to the upper glass sheet surface is usually adjusted to a distance ranging from 12 to 18 inches depending on the area of the glass sheet to be covered. The configuration of the glass sheet to be coated determines the programming of the swivel and/or the reciprocation of the spray gun.

Furthermore, in cases where the sheet to be coated in non-rectangular, the cycle of reciprocating and/or swivelling the spray gun may be adjusted by providing cams in the lines that supply fluid to the piston cylinders 53 and/or 56 so that the speed of movement of the piston within each respective cylinder can be controlled for every portion of each cycle, thereby determining the speed at which the spray gun swivels and/or reciprocates. It is also possible to regulate the rate of flow of the ingredients of the coating composition supplied to the mixing chamber of the spray gun in response to the position occupied by the spray gun during its cycle.

A few specific examples will suffice to illustrate how different shapes can be coated with electroconductive coatings that are substantially uniform, that is, their resistivity per unit area does not vary by more than 10 percent over the entire sheet.

For a rectangular sheet 48 inches by 12 inches having a 14 inch radius of curvature about its longitudinal axis and bus bars disposed along the longer marginal edges, it was only necessary to reciprocate the spray gun from a plane disposed 18 inches above the glass and orient the bent sheet with its length parallel to the axis of reciprocation to obtain adequate uniformity of resistance and a 17 ohm resistance from bus bar to bus bar.

In still another operation, a sheet 24 inches long at one end and 36 inches long at its other end and having oblique sides about 18 inches long each bent to a 10 inch radius along an axis extending along the longer sheet dimension was adequately coated when bus bars were applied along the obliquely extending side portions and the spray gun swivelled for two passes from a position where its orifice was 12 inches above the upper surface of the glass. The resultant bus to bus resistance was 17 ohms with adequate uniformity of resistivity per unit area throughout the sheet. In the latter instance, the swivel cycle was programmed to reduce the angular velocity of swivelling as the spray gun approached a position where the spray impinged on the 36 inch long portion of the sheet and to increase the angular velocity of swivelling as the spray approached the 24 inch long portion of the sheet.

In both of the latter examples, reciprocating or swivelling the spray gun imparted a motion to the spray in the direction of a dimension of the glass sheet that exceeded 12 inches. In the former example, the motion was imparted to the spray by reciprocating the spray gun. In the latter example, the motion was imparted to the spray by swivelling the spray gun. In the latter example, when the spraying was accomplished on a non-rectangular glass sheet, the speed of spray movement was regulated so that the spray moved relatively rapidly through the narrower portion of the sheet and relatively slowly through the wider portion of the sheet.

Temperature control before, during and immediately after the coating step is important in conforming the bent, coated, tempered glass sheets to specifications. Film forming efficiency and conductivity of film formed drops markedly for tin oxide films formed by pyrolysis when the initial temperature is below 1,200° Fahrenheit at the onset of spraying.

Adequate temper results when quenching commences with the coated glass sheet above the strain point, which is approximately 950° Fahrenheit for most glasses. Multiple passes of the spray gun or of multiple spray guns, if needed for larger sheets, permits the glass to recover sufficient temperature between passes and between the coating and quenching steps to produce an adequate temper in the glass. Quenching the glass to produce a temper before applying a film-forming composition reduces the glass temperature to below the strain point. Metal oxide films produced by pyrolysis at such low temperatures have insufficient electroconductivity and form poor connections with bus bars to provide adequate articles of commerce. It is only when bent sheets with bus bars painted thereon are first coated using the bending heat that adequate electrical contact results between the pyrolized metal oxide film and each metallized bus bar. Poor film to bus bar contact results at best when a glass sheet containing a cooled surface with bus bar applied thereon is sprayed with a composition that forms an electroconductive film by pyrolysis.

While the above description has been limited to operations in which the upper surface only of a glass sheet is coated, the present invention also lends itself to producing curved glass sheets having electroconductive coatings on both surfaces. A typical article of commerce is the outer glass sheet of a laminated aircraft windshield provided with a highly electroconductive heating circuit on the inward facing concave surface of the glass sheet and an electroconductive film of relatively high resistance (ranging between 100,000 ohms per square and 10 megohms per square) on the outward facing convex surface of said glass sheet for a grounding circuit to dissipate static. The heating circuit comprises bus bars and a pyrolizable metal oxide film formed as recited above. The electroconductive grounding film is applied to the convex glass surface by spraying a poisoned film forming composition upward from a spray gun mounted below the conveyor 11 in a manner similar to and opposing spray gun 46 onto the lower surface of the glass sheet G at the same time as the upper surface is sprayed. Surprisingly, no problems were encountered in simultaneously spraying the upper and lower glass sheet surfaces using opposing spray guns disposed above and below said glass sheet.

Several compositions capable of producing electroconductive films of high resistance are disclosed in U.S. Pat. No. 2,915,730 in the chart at the bottom of column 4. However, a simple double coating operation was performed on a sheet 48 inches long, 12 inches wide and 0.10 inch thick that arrived at the coating station at a temperature of 1,250° Fahrenheit by applying two passes of organic tin solution No. 7 taken from Table III of U.S. Pat. No. 3,107,177 onto the upper glass surface and a single pass of organic tin solution No. 6 from said table diluted to 10 percent by adding 9 volumes of normal proponal to 1 volume of solution. The film on the upper surface had a thickness of about 3,200 millimicrons, as evidenced by its color of 2nd order red, with a bus to bus resistance of 20 ohms and a resistivity of 60 ohms per square. The lower surface was colorless indicating a thickness of about 70 millimicrons and had an average resistivity on the order of 1 megohm per square.

The added solvent lowered the film forming rate at the under surface. This caused the resulting tin oxide film to have lower electroconductivity than if the added solvent were abesent from the film forming composition for the under surface. The added solvent served as a poisoning agent. Other well known poisoning agents for tin oxide producing films include antimony trichloride, bismuth trichloride, zinc chloride and cobalt chloride.

The present invention has provided a novel sequence of glass treatment steps that results in more efficient use of the heat required to shape the glass than the prior art. The heat applied to the glass for shaping also melts the metallic frit bus bars and enables the film forming composition to pyrolize to produce an electroconductive coating of adequate conductivity and making good electrical contact with the bus bars. At the same time, sufficient residual heat remains in the glass after the film is formed to heat strengthen the glass by air quenching.

The present invention is also suitable for producing bent, coated, heat-strengthened glass sheets whose coatings are useful for characteristics other than for electroconductive purposes, such as those used primarily for heat-screening purposes. Typical heat-screening coatings and their method of preparation are described in U.S. Pat. Nos. 3,081,200 to Edwin H. Tompkins, 3,244,547 to Leighton E. Orr, William O. Lytle and Arnold E. Saunders, 3,410,710 to John M. Mochel and 3,411,934 to Oscar D. Englehart and Joseph E. Michelotti. In such a case, a composition capable of reacting to form a heat-screening coating on contact with hot glass is used instead of those described earlier for producing an electroconductive coating.

In addition, it is realized that it is not necessary to coat an entire glass sheet surface with the coating so produced in case only a portion of the surface is desired to be coated. In such a case, a mask can be applied over the portion of the surface on which a coating is not desired and the mask removed after the partially masked glass sheet is shaped, the coating composition applied while the glass is still hot enough to react with the coating composition to produce a metal oxide coating on the unmasked portion and then the glass is chilled for heat-strengthening. A paste of finely divided titanium dioxide particles in oil serves as a suitable mask.

It is also understood that it is possible to coat the under surface of a glass sheet only instead of its upper surface only, and it is also within the scope of the present invention to shape the glass sheet to the contour of a bending mold whose shaping surface is convex in elevation or a combination of convex and concave elements in elevation rather than to a contour that is concave in elevation.

It is also understood that the principles of the present invention are also followed when the substrate is coated with metal, metal alloy or metal compounds by cathode sputtering or other metal evaporation technique performed in vacuum or near vacuum or other controlled gaseous atmosphere between the shaping and the rapid chilling steps. It may be necessary to reheat the coated substrate in some instances where the coating is formed at too slow a rate to maintain the substrate sufficiently hot for the rapid chilling to impart a temper thereto. However, as long as the novel sequence of steps of heating, shaping, coating and chilling are followed in that order without removing the substrate from the mold, the principles of the present invention are followed.

The form of the invention shown and described in this disclosure represents an illustrative preferred embodiment and certain modifications thereof. It is understood that various changes may be made without departing from the gist of the invention as defined in the claimed subject matter which follows.

We claim:

1. A method of making bent, tempered coated glass sheets comprising the novel sequence of steps comprising:
   a. supporting a flat glass sheet in bending relation to an outline mold having an upper surface conforming to the shape desired for said glass sheet adjacent its marginal periphery,
   b. heating the supported sheet in an enclosed, heated atmosphere to an elevated temperature sufficient to sag the sheet into conformity with said upper surface of said bending mold,
   c. spraying the upper surface of said heated, bent sheet before said glass sheet cools to below its film forming temperature with a film forming composition of a metal compound capable of forming an electroconductive metal oxide coating on contacting a hot glass surface while exposing its under surface to an atmosphere colder than said heated atmosphere,
   d. discontinuing said spraying and exposure after forming a continuous film on said upper surface but before said bent glass sheet cools to below its strain point, and
   e. rapidly chilling both surfaces of the bent, coated glass sheet while said sheet is still supported on said outline bending mold from a time when the bent, coated glass sheet is at a temperature above its strain point until said glass sheet develops at least a partial temper.

2. The method as in claim 1, further including the step of applying to said surface of said glass sheet to be sprayed a stripe of a metalo-ceramic fusible frit capable of fusing to said glass sheet and forming a stripe of electroconductive material fused to said surface when subjected to said heating and chilling, said frit applying step being accomplished prior to said heating.

3. The method as in claim 2, wherein a pair of said stripes of fusible frit is applied along a pair of opposite side edges of said surface to be sprayed prior to said heating and chilling.

4. The method as in claim 1, wherein said elevated temperature is within the range of about 1,000° to about 1,300° Fahrenheit.

5. The method as in claim 1, wherein said quenching is started about 2 to 4 seconds after said coating is discontinued.

6. The method as in claim 1, for use in coating a glass sheet having a dimension greater than about 12 inches, comprising imparting a motion to said spray in the direction of said dimension.

7. The method as in claim 6 for use in coating a glass sheet having a relatively narrow portion and a relatively wide portion, comprising regulating said motion imparted to said spray by increasing the rate of movement of said spray relative to the glass sheet surface when it impinges on said relatively narrow portion and decreasing the rate of movement of said spray relative to the glass sheet surface when it impinges on said relatively wide portion.

8. The method as in claim 1, wherein said spraying is accomplished while moving the origin of said spray relative to said upper surface to have the spray pass over said upper surface several times during said spraying.

9. The method as in claim 1, wherein said spraying is accomplished using a film forming composition comprising an organic tin compound, an ionizable fluorine containing compound and an organic solvent.

10. The method as in claim 1, wherein said atmosphere to which said under surface is exposed during said spraying comprises a spray of a film forming composition of a metal compound capable of forming an electroconductive metal oxide film and including a poisoning agent in said film forming composition that causes the resulting film to have less electroconductivity than the film produced on said upper surface.

11. The method as in claim 1, wherein said upper glass sheet surface is partially masked throughout said heating, spraying and chilling steps.

12. A method of making bent, tempered coated glass sheets comprising the novel sequence of steps comprising:
   a. supporting a flat glass sheet in bending relation to a mold having a surface conforming to the shape desired for said glass sheet adjacent its marginal periphery,
   b. heating the supported sheet in an enclosed heated atmosphere to an elevated temperature sufficient to conform the sheet with said surface of said mold,
   c. applying to one surface of said heated, bent sheet before said glass sheet cools to below its film forming temperature a film forming composition of a metal compound capable of forming a metal oxide coating on contacting a hot glass surface while exposing its opposite surface to an atmosphere colder than said heated atmosphere,
   d. discontinuing said applying and exposure after forming a metal oxide film on said one surface but before said bent glass sheet cools to below its strain point, and
   e. rapidly chilling both surfaces of the bent, coated glass sheet while said sheet is still supported on said mold from a time when the bent, coated glass sheet is at a temperature above its strain point until said glass sheet develops at least a partial temper.

13. The method as in claim 12, wherein said elevated temperature is within the range of about 1,000° to about 1,300° Fahrenheit.

14. The method as in claim 12, wherein said quenching is started about 2 to 4 seconds after said coating is discontinued.

15. The method as in claim 12, for use in coating a glass sheet having a dimension greater than about 12 inches, comprising imparting a motion to means to apply said composition in the direction of said dimension.

16. The method as in claim 15, for use in coating a glass sheet having a relatively narrow portion and a relatively wide portion, comprising regulating said motion imparted to said means by increasing the rate of movement of said means relative to the glass sheet surface when said composition impinges on said relatively narrow portion and decreasing the rate of movement of said means relative to the glass sheet surface when said composition impinges on said relatively wide portion.

17. The method as in claim 12, wherein said applying is accomplished while moving said applying means relative to said one surface to have the means pass over said one surface several times during said applying.

18. The method as in claim 12, wherein said applying is accomplished using a film forming composition comprising an organic tin compound, an ionizable fluorine containing compound and an organic solvent.

19. The method as in claim 12, wherein said atmosphere to which said other surface is exposed during said applying comprises a spray of a film forming composition of a metal compound capable of forming a metal oxide film.

20. The method as in claim 12, wherein said one glass sheet surface is partially masked throughout said heating, applying and chilling steps.

21. A method of making bent, tempered coated glass sheets comprising the novel sequence of steps comprising:
a. supporting a flat glass sheet in bending relation to a mold having a surface conforming to the shape desired for said glass sheet adjacent its marginal periphery,
b. heating the supported sheet in an enclosed heated atmosphere to an elevated temperature sufficient to conform the sheet with said surface of said mold,
c. applying to one surface of said heated, bent sheet before said glass sheet cools to below its film forming temperature a film forming composition of a metal compound capable of forming a coating on contacting a hot glass surface while exposing its opposite surface to an atmosphere colder than said heated atmosphere,
d. discontinuing said applying and exposure after forming a metal oxide film on said one surface but before said bent glass sheet cools to below its strain point, and
e. rapidly chilling both surfaces of the bent, coated glass sheet while said sheet is still supported on said mold from a time when the bent, coated glass sheet is at a temperature above its strain point until said glass sheet develops at least a partial temper.

22. The method as in claim 21 wherein said quenching is started about 2 to 4 seconds after said coating is discontinued.

23. The method as in claim 21, for use in coating a glass sheet having a dimension greater than about 12 inches, comprising imparting a motion to means to apply said composition in the direction of said dimension.

24. The method as in claim 23, for use in coating a glass sheet having a relatively narrow portion and a relatively wide portion, comprising regulating said motion imparted to said means by increasing the rate of movement of said means relative to the glass sheet surface when said composition impinges on said relatively narrow portion and decreasing the rate of movement of said spray relative to the glass sheet surface when said composition impinges on said relatively wide portion.

25. The method as in claim 21, wherein said applying is accomplished while moving said applying means relative to said one surface to have the means pass over said one surface several times during said applying.

26. The method as in claim 21, wherein said one glass sheet surface is partially masked throughout said heating, applying and chilling steps.

* * * * *